United States Patent
Lee et al.

(10) Patent No.: US 8,224,341 B2
(45) Date of Patent: Jul. 17, 2012

(54) METHOD FOR PROVIDING SERVICE, AND METHOD AND APPARATUS FOR ALLOCATING RESOURCE IN WIRELESS COMMUNICATION SYSTEM

(75) Inventors: Seung-Hwan Lee, Daejeon (KR); Jin Up Kim, Daejeon (KR); Kyu Tae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 429 days.

(21) Appl. No.: 12/539,356

(22) Filed: Aug. 11, 2009

(65) Prior Publication Data
US 2010/0035552 A1 Feb. 11, 2010

(30) Foreign Application Priority Data

Aug. 11, 2008 (KR) .................. 10-2008-0078365
Oct. 2, 2008 (KR) .................. 10-2008-0097000

(51) Int. Cl.
*H04Q 7/20* (2006.01)
(52) U.S. Cl. .............. 455/450; 455/62; 455/9; 455/515; 455/509
(58) Field of Classification Search .................. 455/509, 455/406, 405, 442, 552.1, 452.1, 62, 450, 455/9, 515, 115.1, 77; 370/331, 329, 322, 370/347, 338, 342, 335, 341, 468, 206, 260, 370/337, 462, 328, 318, 431, 319, 312, 230; 375/260, 295

See application file for complete search history.

(56) References Cited

U.S. PATENT DOCUMENTS

| 5,987,021 | A * | 11/1999 | Erickson et al. | 370/347 |
|---|---|---|---|---|
| 8,005,041 | B2 * | 8/2011 | Speight | 370/329 |
| 8,112,091 | B2 * | 2/2012 | Chun et al. | 455/450 |
| 2004/0131026 | A1 * | 7/2004 | Kim et al. | 370/328 |
| 2005/0063330 | A1 * | 3/2005 | Lee et al. | 370/328 |
| 2005/0088989 | A1 * | 4/2005 | Lee et al. | 370/328 |
| 2005/0117536 | A1 * | 6/2005 | Cho et al. | 370/328 |

(Continued)

FOREIGN PATENT DOCUMENTS

KR 1999-002838 1/1999

(Continued)

OTHER PUBLICATIONS

Korean Notice of Allowance for Application No. KR10-2008-0097000, dated Jun. 21, 2011.

*Primary Examiner* — Tan Trinh
(74) *Attorney, Agent, or Firm* — Nelson Mullins Riley & Scarborough LLP; EuiHoon Lee, Esq.

(57) ABSTRACT

Provided is a method for providing a service, and a method and an apparatus for allocating a resource in a wireless communication system. Services to be provided to users are divided into one of primary and secondary services based on priority in terms of frequency utilization. A service is provided using frequency channel remaining after being used in the primary service in a time zone when frequency utilization rate of the primary service is a threshold value or less. Accordingly, when service data corresponding to the secondary service are received, a user terminal stores the service data in a storage unit. Then, when the user requests provision of the corresponding service, the user terminal provides the stored service data to the user.

13 Claims, 6 Drawing Sheets

U.S. PATENT DOCUMENTS

| | | | |
|---|---|---|---|
| 2005/0152372 A1 | 7/2005 | Kim et al. | |
| 2007/0101367 A1* | 5/2007 | Lee et al. | 725/39 |
| 2007/0189197 A1* | 8/2007 | Kwon et al. | 370/319 |
| 2008/0101271 A1* | 5/2008 | Kwon et al. | 370/312 |
| 2008/0130725 A1 | 6/2008 | Yu et al. | |
| 2008/0159323 A1* | 7/2008 | Rinne et al. | 370/431 |
| 2008/0305819 A1* | 12/2008 | Chun et al. | 455/509 |
| 2009/0103562 A1* | 4/2009 | Frederiksen et al. | 370/468 |
| 2009/0116430 A1* | 5/2009 | Bonta et al. | 370/329 |
| 2010/0046444 A1* | 2/2010 | Lin et al. | 370/329 |
| 2010/0046451 A1* | 2/2010 | Tada et al. | 370/329 |
| 2012/0014337 A1* | 1/2012 | Speight | 370/329 |

FOREIGN PATENT DOCUMENTS

| | | |
|---|---|---|
| KR | 1020050074253 A1 | 7/2005 |
| KR | 1020060060452 | 6/2006 |
| KR | 1020070039789 | 4/2007 |
| KR | 1020070075839 | 7/2007 |
| KR | 1020080047929 A2 | 5/2008 |

* cited by examiner

METHOD FOR PROVIDING SERVICE, AND METHOD AND APPARATUS FOR ALLOCATING RESOURCE IN WIRELESS COMMUNICATION SYSTEM

CROSS-REFERENCE TO RELATED APPLICATION

This application claims priority to and the benefit of Korean Patent Application Nos. 10-2008-0078365 and 10-2008-0097000 filed in the Korean Intellectual Property Office on Aug. 11, 2008 and Oct. 2, 2008, the entire contents of which are incorporated herein by reference.

BACKGROUND OF THE INVENTION (a) Field of the Invention

The present invention relates to a method for providing a service, and a method and an apparatus for allocating a resource in a wireless communication system.

(b) Description of the Related Art

An existing wireless communication service system has a deviation in frequency utilization rate per time and region. However, generally, since a maximum utilization amount is considered in designing the wireless communication system, in the case where the frequency utilization rate is low, system constructing cost versus use profit is low so that the wireless communication service is uneconomic. For example, an existing mobile communication service has a lower service utilization rate at midnight as compared to rush hour. Therefore, in the case where the mobile communication system is designed in consideration of the maximum utilization amount, waste of frequency resources and a system are caused.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for utilizing a frequency having advantages of raising frequency utilization efficiency in a wireless communication system.

An exemplary embodiment of the present invention provides a method for allocating a resource by a radio access apparatus in a wireless communication system, the method including:
dividing services to be provided to users into one of first and second services; searching a frequency utilization rate of the service divided as the first service; and allocating frequency channel remaining after being used in the first service to the service divided as the second service when the frequency utilization rate is a threshold value or less.

Another exemplary embodiment of the present invention provides a method for providing a service by a user terminal in a wireless communication system, the method including:
receiving resource allocation information from a radio access apparatus that allocates radio resources for each service in a manner such that frequency channel is preferentially allocated to a first service, and when the frequency utilization rate of the first service is a threshold value or less, frequency channel remaining after being used in the first service is allocated to a second service; when received service data corresponds to the second service, storing the received service data in a storage unit; and when a user requests provision of the second service, providing the service data stored in the storage unit to the user.

Yet another exemplary embodiment of the present invention provides an apparatus for allocating a resource in a wireless communication system, the apparatus including:
a resource allocating unit that divides services to be provided to users into one of first and second services, preferentially allocates frequency channel to the service divided as the first service, and when frequency utilization rate of the first service is a threshold value or less, allocates frequency channel remaining after being used in the first service to the service divided as the second service; and a wireless communication module that provides service data to a user terminal based on radio resources allocated for each service in the resource allocating unit.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

A method for providing a service, and a method and an apparatus for allocating a resource in a wireless communication system according to an exemplary embodiment of the present invention will be described in detail with reference to accompanying drawings.

Figure 1:
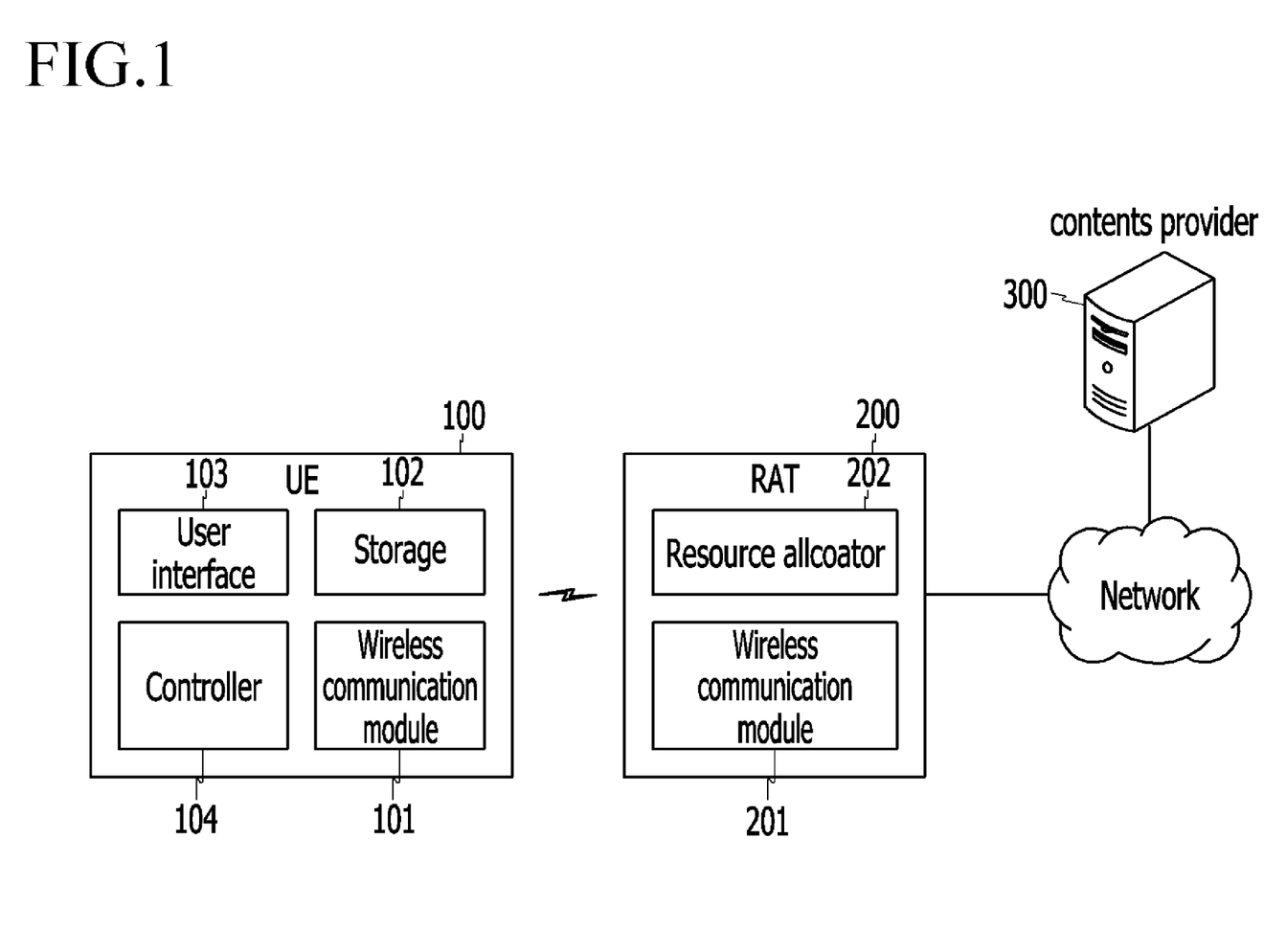
FIG. 1 is a configuration diagram showing a wireless communication system according to an exemplary embodiment of the present invention.
Figure 2:
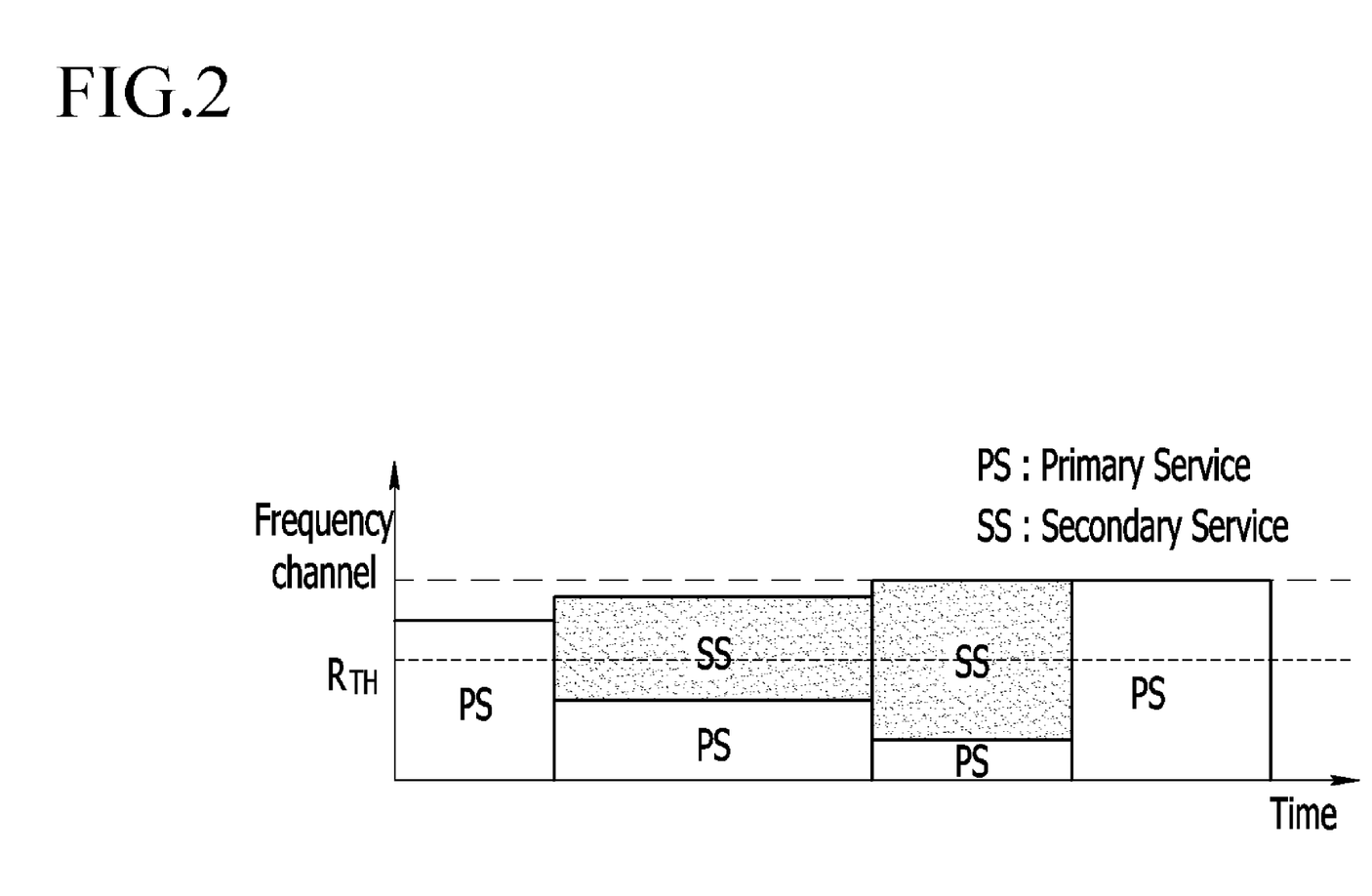
FIG. 2 shows one example of resource allocation according to the exemplary embodiment of the present invention.

FIG. 1 is a configuration diagram showing a wireless communication system according to an exemplary embodiment of the present invention, and FIG. 2 shows one example of resource allocation according to the exemplary embodiment of the present invention.

A user terminal (UE) 100 and a radio access apparatus (it may be also called a radio access technology (RAT) as shown in FIG. 1) 200 according to the exemplary embodiment of the present invention may conform to a mobile communication specification such as the 3rd Generation Partnership Project (3GPP), etc., or a packet communication specification such as Wireless Broadband (WiBro), etc. However, the present invention is not limited to the specific specifications.

Referring to FIG. 1, the user terminal 100 includes a wireless communication module 101, a storage unit 102, a user interface 103 and a controller 104, and provides a variety of wireless communication services to a user through wireless communication with the radio access apparatus 200.

The wireless communication module 101 of the user terminal 100 performs wireless communication with the radio access apparatus 200, and the storage unit 102 thereof stores user data when necessary and service data corresponding to a wireless communication service, etc.

Also, the controller 104 controls operations of each component based on control commands input from the user through the user interface 103, and stores the service data received through the wireless communication module 101 in the storage unit 102 or provides the service data to the user through the user interface 103 according to the control commands input. In addition, the controller 104 may also provide the service data to another terminal connected to the user terminal 100.

The radio access apparatus 200 includes a wireless communication module 201 and a resource allocating unit 202, and transfers various wireless communication services provided by one or more contents provider 300 connected to a network to the user terminal 100.

The wireless communication module 201 of the radio access apparatus 200 transfers various service data received from one or more contents providers 300 connected to the network to the user terminal 100 through radio resources allocated for each service.

The resource allocating unit 202 divides the wireless communication services provided to the user terminal 101 into a primary service and a secondary service. The resource allocating unit 202 differentiates the allocation of the radio resource, that is, frequency channel, depending on whether the corresponding wireless communication service is the primary service or the secondary service.

That is, the frequency channel is allocated to the wireless communication service corresponding to the primary service in a general manner, and frequency channel remaining after being used in the primary service is allocated to the wireless communication service corresponding to the secondary service if available, as shown in FIG. 2. Referring to FIG. 2, the resource allocating unit 202 searches the frequency utilization rate of the wireless communication service corresponding to the primary service in real time, and when the frequency utilization rate of the primary service is a threshold value ($R_{TH}$) or less, allocates the frequency channel remaining after being used in the primary service to the secondary service. Thus, in the case where the frequency utilization rate of the primary service is the threshold value ($R_{TH}$) or less, the resource allocating unit 202 may simultaneously provide the primary and secondary services. On the other hand, in the case where the frequency utilization rate of the primary service is larger than the threshold value ($R_{TH}$), the resource allocating unit 202 does not provide the radio resource to the secondary service.

Meanwhile, the resource allocating unit 202 uses priority in terms of frequency utilization in order to divide the wireless communication service into the primary service or the secondary service, wherein the priority in terms of frequency utilization may be determined by a real time property of the corresponding wireless communication service, user requirements, service fare, etc.

As a result, the resource allocating unit 202 determines a service of which the start and the end of transmission of service data should be determined according to request by the user terminal, such as mobile communication service, Wibro service, etc., that is, a wireless communication service of which service data should be provided to the user in real time, as the primary service. Also, the resource allocating unit 202 determines a remaining service except for the primary service as the secondary service, wherein the remaining service except for the primary service is a service of which the start and the end of the transmission of the service data are determined according to resource allocation of the radio access apparatus rather than the request by the user terminal, that is, a wireless communication service of which, although the user requests the service data, the start and the end of the transmission of the service data are determined according to the resource allocation in consideration of the frequency utilization rate rather than the request by the user.

For example, since voice and video calls, etc., corresponding to the mobile communication service are services of which the service data should be provided to the user in real time when the user requests use of the service, they have a high priority in terms of frequency utilization. Thus, the resource allocating unit 202 divides the service into the primary service.

On the other hand, a wireless communication service of which the service data does not need to be provided to the user in real time has a relatively lower priority in terms of the frequency utilization as compared to the primary service. Thus, the resource allocating unit 202 divides the service into the secondary service. The secondary service includes a Video-On-Demand (VOD) service, an e-subscription service such as newspapers, magazines, etc., an e-learning service, an e-upgrade service such as navigation maps, etc., an e-information service such as traffic information, etc., an e-ad service, and the like.

Meanwhile, in the case where a manner of providing the secondary service is a one-to-multiple manner, that is, in the case of providing the same wireless communication service to a plurality of users, the radio access apparatus 200 provides the wireless communication service using a wireless communication frequency band in a form of a broadcasting channel. Therefore, the wireless communication service may also be referred to as a broadcasting and communication convergence service.

The resource allocating unit 202 may confirm priority information per wireless communication service used to divide the wireless communication services into the primary service or the secondary service from service request information by the user and service identification information received from the contents provider 300 through a control channel, etc.

Generally, the wireless communication service such as a mobile communication service provided in real time, etc., has a deviation in frequency utilization rate according to time and region. Thus, the frequency channel remaining after being used in the primary service is allocated to the secondary service that does not need to be provided in real time based on the frequency utilization rate of the primary service different per time and region as described above, thereby reducing the deviation in the frequency utilization rate according to the time and region and totally raising the frequency utilization rate.

Although the exemplary embodiment of the present invention has divided the primary service and the secondary service according to whether the service data is provided to the user in real time or not, the present invention is not limited thereto, and may also divide the primary service and the secondary service based on other frequency utilization priorities.

Figure 3:
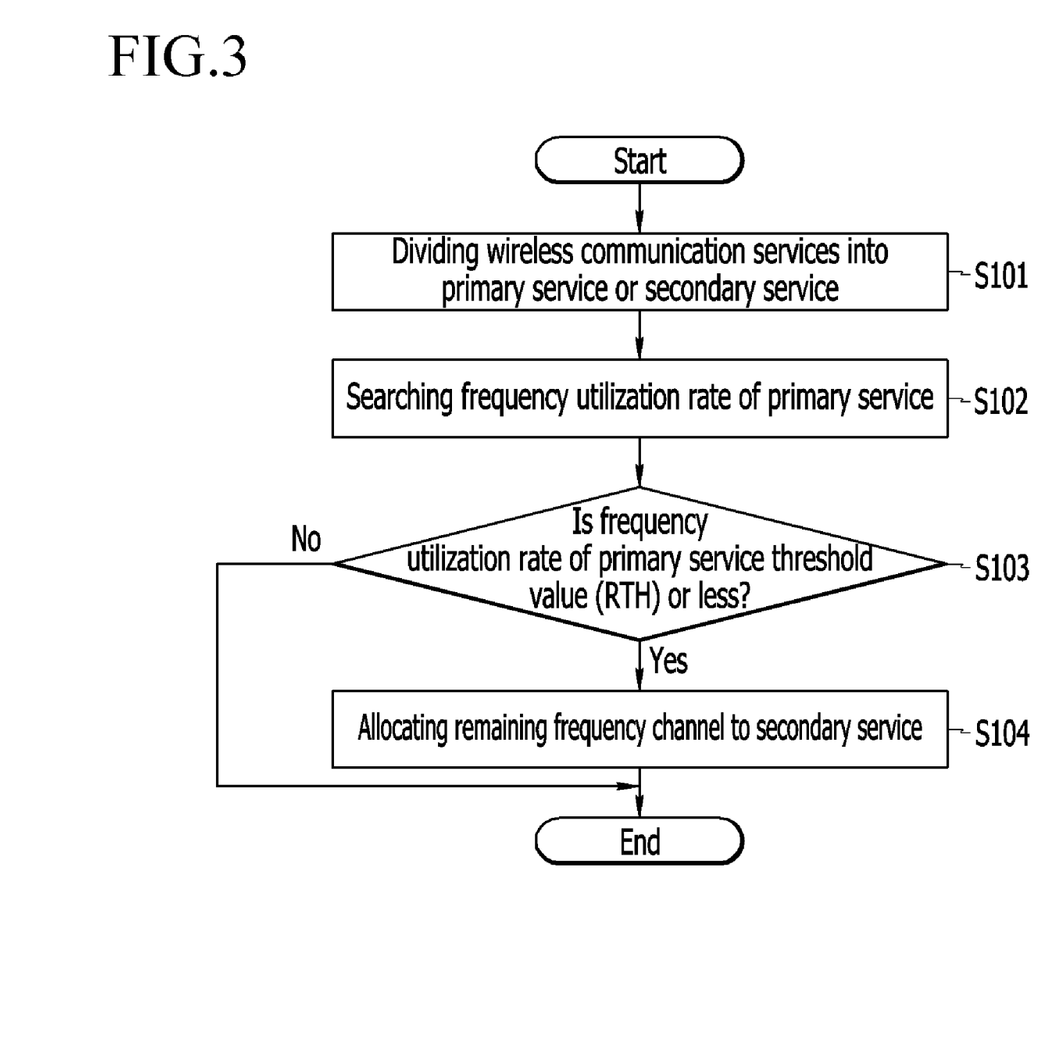
FIG. 3 is a flowchart showing a method for allocating a resource in a radio access apparatus according to the exemplary embodiment of the present invention.

FIG. 3 is a flowchart showing a method for allocating a resource in a radio access apparatus 200 according to the exemplary embodiment of the present invention.

Referring to FIG. 3, first, the radio access apparatus 200 divides the wireless communication services to be provided to the user terminal 100 into the primary service or the secondary service through the resource allocating unit 202 (S101). Herein, the radio access apparatus 200 divides the wireless communication services into the primary service or the secondary service based on the service request information by the user or the service identification information received from the contents provider 300 through the control channel, etc.

Thereafter, if the wireless communication service is the primary service, the resource allocating unit 202 of the radio access apparatus 200 preferentially allocates the radio resource, that is, the frequency channel, to the primary service. On the other hand, if the wireless communication service is the secondary service, the resource allocating unit 202 searches the frequency utilization rate of the primary service in real time (S102). The resource allocating unit 202 compares the searched frequency utilization rate of the primary service to a threshold value $R_{TH}$ (S103). When the frequency utilization rate of the primary service is the threshold value $R_{TH}$ or less, the resource allocating unit 202 allocates frequency channel remaining after being used in the primary service, that is, frequency channel not used in the primary service, to the secondary service (S104).

On the other hand, when the frequency utilization rate of the searched primary service is larger than the threshold value $R_{TH}$, the resource allocating unit 202 does not allocate a separate frequency channel to the secondary service.

Meanwhile, when allocating the radio resource as described above, in the case of the secondary service, the user terminal 100 does not start and end the wireless communication service according to the control commands from the user, unlike the primary service. The user previously requests provision of the corresponding service, and the user terminal 100 receives service data of the corresponding service through the radio resource allocated only if the frequency utilization rate of the primary service is the threshold value or less and stores it in the storage unit 102. If the user requests provision of the service at any time after provision of the service data is completed, the corresponding service may be provided using the stored service data.

Figure 4:
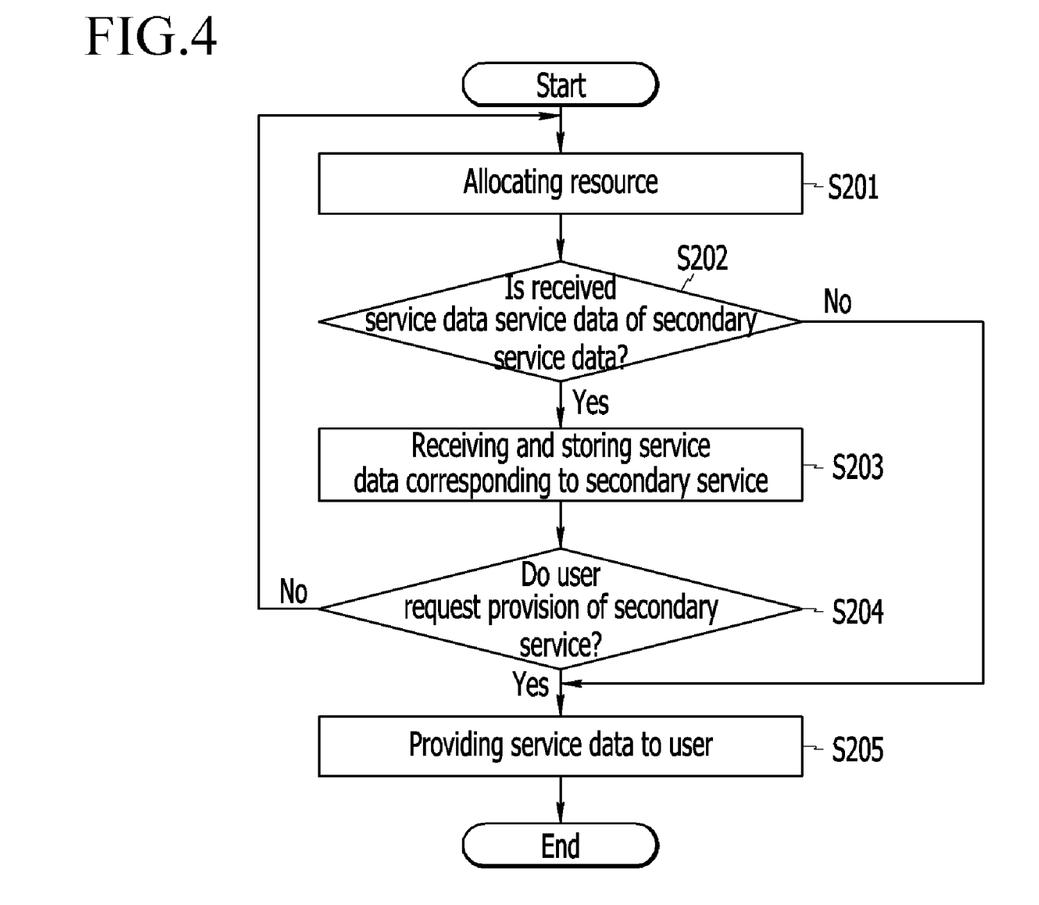
FIG. 4 is a flowchart showing a method for providing a communication service in a user terminal according to the exemplary embodiment of the present invention.

FIG. 4 is a flowchart showing a method for providing a communication service in a user terminal 100 according to the exemplary embodiment of the present invention.

Referring to FIG. 4, first, the resources are allocated from the radio access apparatus 200 to the user terminal 100 in order to provide the service (S201). Herein, the radio access apparatus 200 allocates the radio resources in a manner so that if the user requests provision of the primary service, the radio resources are preferentially allocated to the primary service, and if the frequency utilization rate of the primary service is the threshold value or less, the frequency channel remaining after being used in the primary service is allocated to the secondary service previously registered by the user.

Thereafter, the user terminal 100 confirms whether the service data received from the radio access apparatus 200 corresponds to the primary service or the secondary service (S202). If the received service data corresponds to the secondary service, the user terminal 100 stores the received service data in the storage unit 102 (S203). When the request for use of the secondary service is input from the user (S204), the user terminal 100 reads the service data stored in the storage unit 102 to provide the service data to the user (S205).

On the other hand, if the received service data corresponds to the primary service, the user terminal 100 provides the received service data to the user in real time (S205).

Meanwhile, in the case where the primary service and the second service are simultaneously provided from the radio access apparatus 200, the user terminal provides the primary service to the user, and at the same time, stores the secondary service data in the storage unit 102 by a machine-to-machine communication protocol so that the user is not aware of transmission of the secondary service data. To this end, the user terminal 100 should include a machine-to-machine communication protocol function for receiving the secondary service.

Meanwhile, although a case where the service data corresponding to the secondary service stored in the user terminal 100 is directly provided to the user is illustrated by way of example in FIG. 4, the user terminal 100 may also provide the stored service data to another terminal (now shown). In this case, when the request for transferring the service data from the user or another terminal connected to the user terminal 100 is received, the controller 104 provides the corresponding service data to the corresponding terminal.

Figure 5:
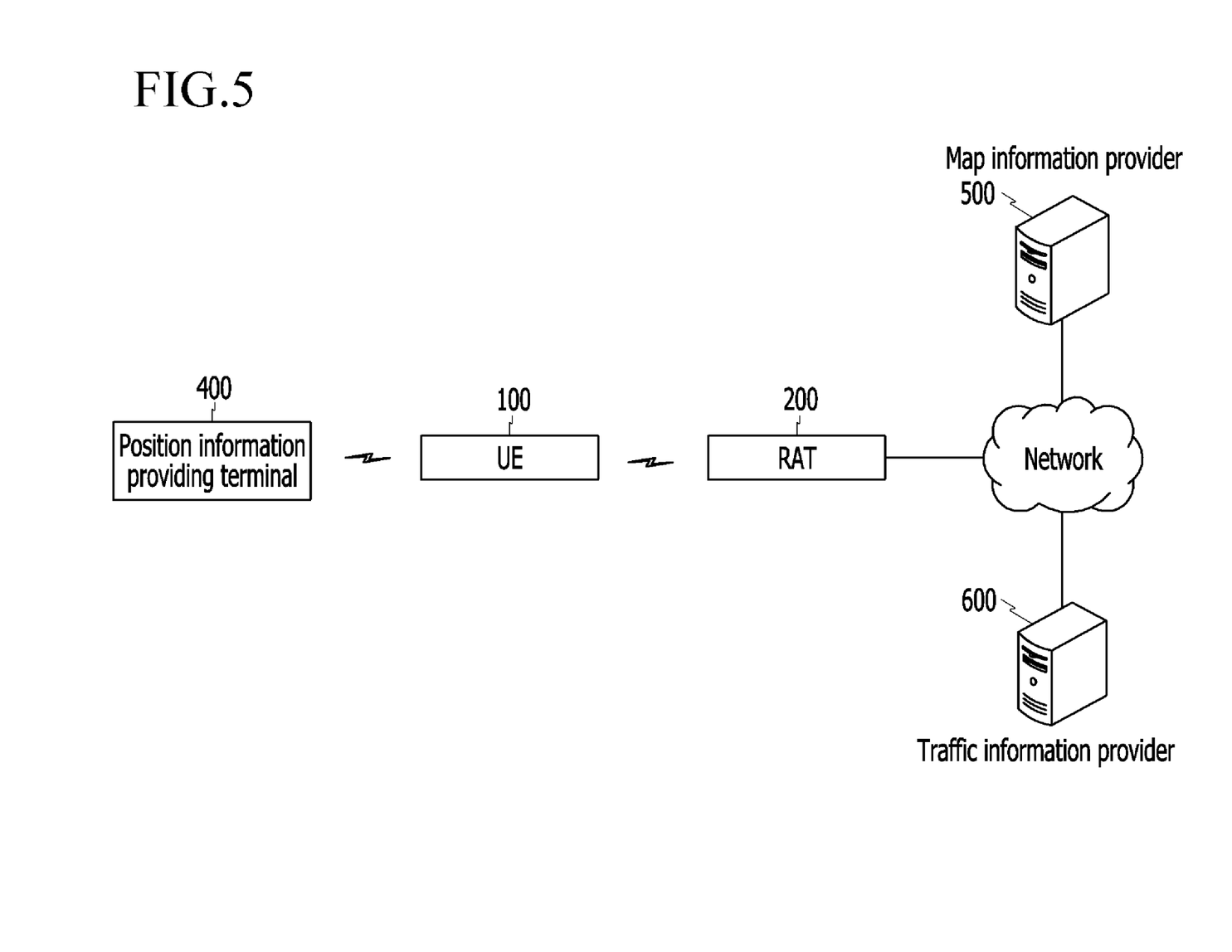
FIG. 5 shows one example of a wireless communication system according to the exemplary embodiment of the present invention.
Figure 6:
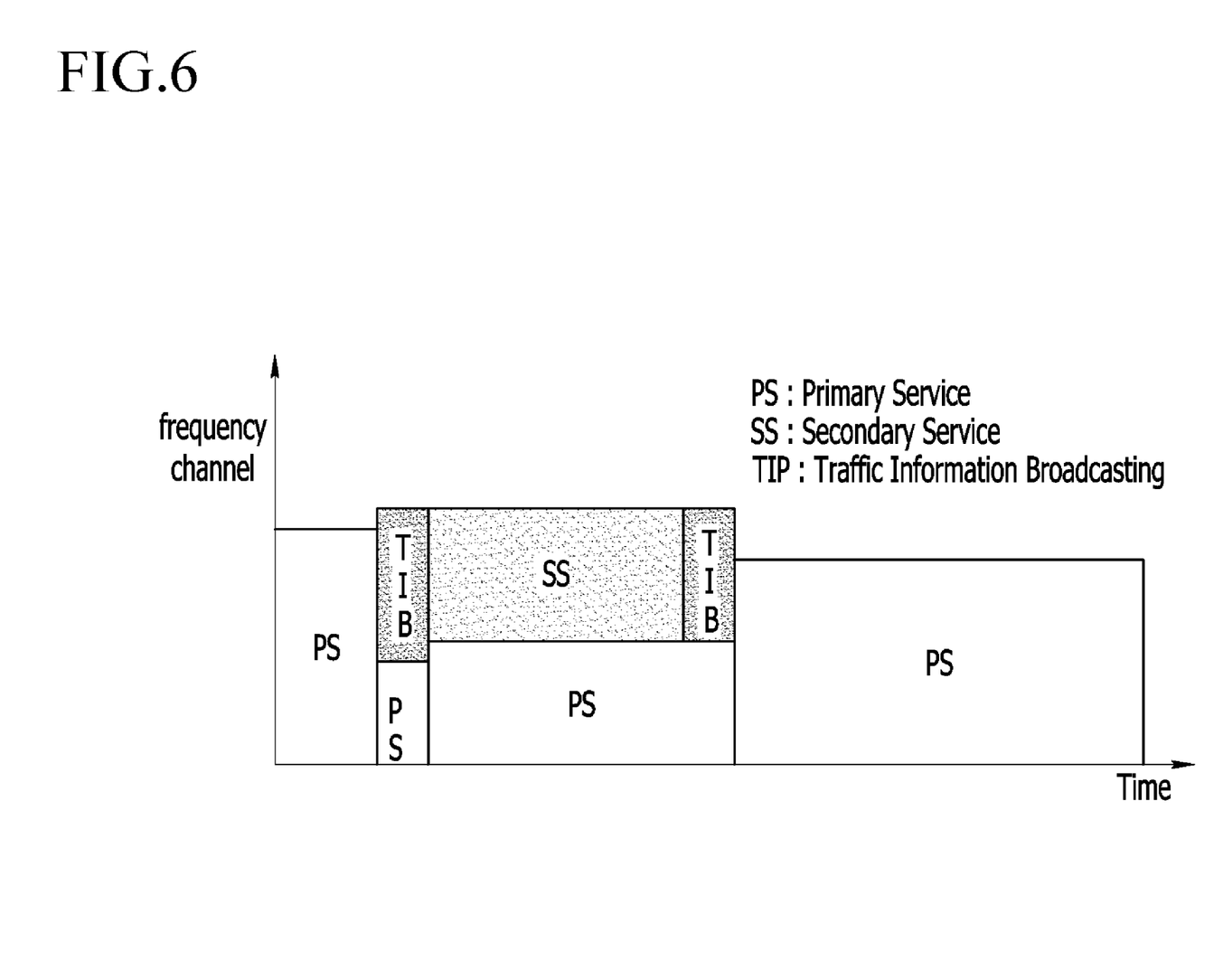
FIG. 6 shows one example of resource allocation according to the exemplary embodiment of the present invention, wherein a case where traffic information broadcasting is provided in a form of a wireless communication service is illustrated by way of example.

FIG. 5 shows one example of a wireless communication system according to the exemplary embodiment of the present invention, wherein a case where a position information providing terminal 400 provides a position information providing service using position information data received through the user terminal 100 is illustrated by way of example. Also, FIG. 6 shows one example of resource allocation according to the exemplary embodiment of the present invention, wherein a case where traffic information broadcasting (TIB) that is provided in a form of a broadcasting and communication convergence service is illustrated by way of example.

Recently, a position information providing service providing position information in real time using a global positioning system (GPS) and map information has commonly been used. The user using the position information providing service needs to update the map information of the position information providing terminal 400 at a certain period. Also, when the position information providing terminal providing the position information using real-time traffic information provided through digital multimedia broadcasting (DMB) channels is located at a site where DMB is not received, a problem that it does not receives the traffic information in real time occurs.

FIG. 5 is one example where the method for providing the service according to the exemplary embodiment of the present invention is applied to update map information of the position information providing terminal 400 in order to solve the problem. Referring to FIG. 5, the user terminal 100 receives and stores the upgraded map information provided by a map information provider 500 in a form of the secondary service at a time zone when the frequency utilization rate of the primary service is low, and informs the user thereof. The informed user transfers the map information stored in the user terminal 100 to the position information providing terminal 400 through a wireless personal area network (WPAN) communication manner, etc., thereby upgrading the map information of the position information providing terminal 400.

Herein, the position information providing terminal 400 may be a navigator, a personal multimedia player (PMP) including a navigation function, etc.

Also, in the case where the user terminal 100 positioned in a vehicle on the road is connected to a wireless communication network, the user terminal 100 receives the real-time traffic information provided by the traffic information provider 600 per a certain time in the form of the secondary service through the radio access apparatus 200 in the time zone when the frequency utilization rate of the primary service is low. The user terminal 100 transfers the received traffic information to the position information providing terminal 400 so that the real-time traffic information may be utilized for a position information providing algorithm. Herein, the real-time traffic information may be provided in a one-to-multiple manner, and thus may be provided in a form of a traffic information broadcasting service through the broadcasting channel FIG. 6 shows one example of resource allocation corresponding to a case where the traffic information broadcasting (TIB) service is included in the wireless communication service.

Meanwhile, although FIG. 5 has illustrated the case where the user terminal 100 does not include the navigation function by way of example, the present invention may also be equally applied to the case where the user terminal 100 includes the navigation function. In this case, the user terminal 100 does not need to transfer the upgraded map information or the real-time traffic information to a separate position information providing terminal.

As described above, a method for dynamically allocating the frequency channel to the secondary service in which the service data does not need to be provided to the user in real time according to the frequency utilization rate of the primary service such as the wireless communication service, etc., raises frequency utilization efficiency, thereby generating an effect that service use fare of the user may be lowered and a service operator may create a new profit. Particularly, in the case of the broadcasting and communication convergence service providing the service in the one-to-multiple manner, the effect becomes significant.

For example, in the case where several users request the same English lecture service updated per a certain time (e.g., one day) through wireless communication, a wireless communication operator may simultaneously provide the same English conversation moving picture lecture contents to the several users using one broadcasting channel at the time zone when the frequency utilization rate is low. Accordingly, since different radio resources do not need to be allocated to each user in order to provide the corresponding contents, the contents provider may inexpensively provide the corresponding service to the user.

Considering an advertisement service as another example, the wireless communication operator may provide the advertisement service provided from an advertisement contents provider to many unspecified users through one broadcasting channel at the time zone when the frequency utilization rate is low, as described above, or may include and transfer advertisement contents in specified video contents, etc. Accordingly, the wireless communication operator provides a benefit of a certain fare reduction to the user that has agreed to receive the advertisement contents, and imposes a certain frequency utilization fare according to the provision of the advertisement contents on the advertisement contents provider, thereby making it possible to create a new profit.

With the exemplary embodiments of the present invention, frequency utilization efficiency is raised, thereby generating an effect that a service use fare of a user may be lowered and a service operator may create a new profit.

The above-mentioned exemplary embodiments of the present invention are not embodied only by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a radio access apparatus to allocate a resource according to a characteristic of a service in a wireless communication system, comprising:
   classifying services to be provided to users into one of first and second services based on a predetermined criteria for classification;
   searching a frequency utilization rate of a service classified as the first service; and
   allocating the frequency channel remaining after being used in the first service to a service classified as the second service when the frequency utilization rate of the first service is a threshold value or less.

2. The method for allocating the resource of claim 1, wherein the dividing includes dividing the services to be provided to the users into one of first and second services based on service request information by the user.

3. The method for allocating the resource of claim 2, wherein the first service is a service of which service data is provided to the user in real time, and the second service is a non-real time service.

4. The method for allocating the resource of claim 3, wherein the user terminal determines the start and end of reception of service data corresponding to the first service based on control commands from the user, and determines the start and end of reception of service data corresponding to the second service based on the start and end of transmission of service data of the radio access terminal.

5. The method for allocating the resource of claim 1, wherein the dividing includes dividing the services to be provided to the users into one of first and second services based on service identification information received from a corresponding contents provider through a control channel.

6. The method for allocating the resource of claim 1, further comprising:
   not allocating the resource to the service classified as the second service when the frequency utilization rate of the first service is more than the threshold value.

7. The method for allocating the resource of claim 6, wherein
   not allocating the resource to the service classified as the second service includes allocating the frequency channel remaining after being used in the first service to the service classified as the second service after the frequency utilization rate of the first service is the threshold value or less again.

8. A method for providing a service by a user terminal in a wireless communication system, comprising:

receiving resource allocation information from a radio access apparatus that allocates radio resources for each service in a manner such that frequency channel is preferentially allocated to a first service, and when frequency utilization rate of the first service is a threshold value or less, frequency channel remaining after being used in the first service is allocated to a second service;

when received service data corresponds to the second service, storing the received service data in a storage unit; and when a user requests provision of the second service, providing the service data stored in the storage unit to the user.

9. The method for providing the service of claim 8, further comprising:

when the received service data corresponds to the first service, providing the received service data to the user.

10. The method for providing the service of claim 8, wherein the start and end of reception of service data corresponding to the first service are determined by request of the user, and the start and end of reception of service data corresponding to the second service are determined by resource allocation by the radio access apparatus.

11. An apparatus for allocating a resource according to a characteristic of a service in a wireless communication system, comprising:

a resource allocating unit that classifies services to be provided to users into one of first and second services based on a predetermined criteria for classification, preferentially allocates frequency channel to the service classified as the first service, and when a frequency utilization rate of the first service is a threshold value or less, allocates frequency channel remaining after being used in the first service to the service classified as the second service; and a wireless communication module that provides service data to a user terminal based on radio resources allocated for each service in the resource allocating unit.

12. The apparatus for allocating the resource of claim 11, wherein the first service is a service in which service data is provided to the user in real time, and the second service is a non-real time service.

13. The apparatus for allocating the resource of claim 12, wherein the first service includes a mobile communication service and a Wibro service, and the second service includes a broadcasting and communication convergence service.

* * * * *